US010656761B2

(12) United States Patent
Chen et al.

(10) Patent No.: US 10,656,761 B2
(45) Date of Patent: May 19, 2020

(54) TOUCH SCREEN AND METHOD OF COMPENSATING FOR DIFFERENCES IN ROUTING TRACE PATH LENGTHS

(71) Applicant: DELL PRODUCTS L.P., Round Rock, TX (US)

(72) Inventors: Chung-Jen Chen, Taipei (TW); Chin-Chih Lin, New Taipei (TW); Yao-Hsien Huang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 15/498,035

(22) Filed: Apr. 26, 2017

(65) Prior Publication Data

US 2018/0314376 A1    Nov. 1, 2018

(51) Int. Cl.
*G06F 3/041*    (2006.01)
*G06F 3/044*    (2006.01)

(52) U.S. Cl.
CPC .......... *G06F 3/0418* (2013.01); *G06F 3/0445* (2019.05); *G06F 3/0446* (2019.05); *G06F 3/04164* (2019.05)

(58) Field of Classification Search
CPC ...... G06F 3/044; G06F 3/0416; G06F 3/0418; G06F 3/041
See application file for complete search history.

(56) References Cited

U.S. PATENT DOCUMENTS

| 8,026,904 | B2 | 9/2011 | Westerman | |
| 8,125,455 | B2* | 2/2012 | Land | G06F 3/0418 |
| | | | | 178/18.01 |
| 8,125,464 | B2* | 2/2012 | Land | G06F 3/0418 |
| | | | | 178/18.01 |
| 8,970,504 | B2* | 3/2015 | Huang | G06F 3/044 |
| | | | | 345/173 |
| 9,223,436 | B2* | 12/2015 | Land | G06F 3/0418 |
| 9,240,297 | B2* | 1/2016 | Lee | G06F 3/044 |
| 9,645,677 | B2* | 5/2017 | Sagawai | G06F 3/0418 |
| 9,851,760 | B2* | 12/2017 | Chang | G06F 1/1692 |
| 2008/0158176 | A1* | 7/2008 | Land | G06F 3/0418 |
| | | | | 345/173 |
| 2009/0183132 | A1* | 7/2009 | Izuha | G06F 17/5068 |
| | | | | 716/122 |

(Continued)

*Primary Examiner* — Patrick F Marinelli
(74) *Attorney, Agent, or Firm* — Egan Peterman Enders Huston

(57) ABSTRACT

Touch sensitive input devices and routing trace configurations designed to reduce border dimensions of such devices are provided herein. The touch sensitive input devices include a touch panel having a plurality of transmit lines and a plurality of receive lines, which are arranged with the plurality of transmit lines in a grid pattern, such that a sense node is disposed on the touch panel at each intersection of the transmit and receive lines. More specifically, the touch panel includes a first subset of the transmit lines coupled to routing traces on only a first side of the touch panel, a second subset of the transmit lines coupled to routing traces on only a second side of the touch panel, and a third subset of the transmit lines coupled to routing traces on both the first side and the second side of the touch panel. Methods are provided herein for compensating for differences in routing trace path lengths, so as to provide accurate detection of touch event locations on the touch panel.

19 Claims, 7 Drawing Sheets

(56) References Cited

U.S. PATENT DOCUMENTS

| | | | |
|---|---|---|---|
| 2009/0266621 A1* | 10/2009 | Huang | G06F 3/044 178/18.01 |
| 2010/0060589 A1* | 3/2010 | Wilson | G06F 3/0412 345/173 |
| 2010/0302182 A1* | 12/2010 | Wei | G06F 3/0412 345/173 |
| 2011/0037735 A1* | 2/2011 | Land | G06F 3/0418 345/178 |
| 2011/0304566 A1* | 12/2011 | Han | G06F 3/044 345/173 |
| 2014/0070875 A1* | 3/2014 | Dunphy | G06F 3/0418 327/517 |
| 2014/0092023 A1* | 4/2014 | Lo | G06F 3/041 345/173 |
| 2014/0110236 A1* | 4/2014 | Lee | H01H 13/704 200/5 A |
| 2015/0077386 A1* | 3/2015 | Huang | G06F 3/044 345/174 |
| 2015/0220185 A1* | 8/2015 | Kim | G06F 3/044 345/174 |
| 2015/0261340 A1 | 9/2015 | Krah | |
| 2015/0324044 A1* | 11/2015 | Chen | G06F 3/044 345/174 |
| 2015/0362960 A1* | 12/2015 | Chang | G06F 3/044 345/173 |
| 2016/0054836 A1* | 2/2016 | Wu | G06F 3/044 345/173 |
| 2016/0070394 A1* | 3/2016 | Van Ostrand | G06F 3/047 345/173 |
| 2016/0098143 A1 | 4/2016 | Kida et al. | |
| 2016/0117049 A1* | 4/2016 | Sagawai | G06F 3/0418 345/174 |
| 2016/0216838 A1* | 7/2016 | Aina | G06F 3/0418 |
| 2016/0231098 A1* | 8/2016 | Otaka | G06F 3/044 |
| 2016/0334910 A1* | 11/2016 | Ono | G06F 3/0412 |
| 2017/0024060 A1* | 1/2017 | Seong | G06F 3/044 |
| 2017/0228058 A1* | 8/2017 | Huang | G06F 3/044 |
| 2017/0262117 A1* | 9/2017 | Huang | G06F 3/0416 |

\* cited by examiner

400 →

| 5179 | 4949 | 5115 | 5149 | 4928 | 5025 | 4906 | 5036 | 4926 | 4918 | 5005 |
|------|------|------|------|------|------|------|------|------|------|------|
| 5088 | 5107 | 4973 | 5014 | 5039 | 5003 | 5017 | 4993 | 4958 | 4937 | 4966 |
| 4915 | 5033 | 4907 | 5090 | 4936 | 4909 | 5010 | 4927 | 5033 | 5051 | 5081 |
| 4975 | 5110 | 5078 | 5126 | 5137 | 5159 | 5190 | 5190 | 5046 | 5142 | 4916 |
| 5520 | 5509 | 5477 | 5508 | 5309 | 5446 | 5532 | 5329 | 5452 | 5305 | 5588 |
| 4567 | 4395 | 4465 | 4364 | 4329 | 4589 | 4418 | 4574 | 4446 | 4526 | 4576 |
| 4427 | 4450 | 4551 | 4383 | 4524 | 4404 | 4403 | 4395 | 4319 | 4402 | 4435 |
| 4574 | 4566 | 4542 | 4432 | 4576 | 4319 | 4371 | 4556 | 4574 | 4347 | 4508 |
| 4439 | 4365 | 4587 | 4425 | 4352 | 4309 | 4488 | 4363 | 4571 | 4465 | 4325 |

Rows 1–4: 420; Row 5: 430; Rows 6–9: 410

| 5008 | 5132 | 5115 | 5120 | 5086 | 4951 | 5062 | 5136 | 4975 | 5119 | 5083 |
|------|------|------|------|------|------|------|------|------|------|------|
| 5136 | 5078 | 4977 | 5055 | 5190 | 4977 | 4975 | 4983 | 4997 | 5187 | 5091 |
| 4968 | 5098 | 5111 | 4995 | 5089 | 5148 | 5146 | 4933 | 5116 | 5022 | 5075 |
| 4972 | 5071 | 5136 | 4964 | 4984 | 5180 | 5113 | 4939 | 5082 | 5171 | 4980 |
| 4990 | 5116 | 5074 | 4943 | 5198 | 5127 | 5135 | 5049 | 4996 | 5093 | 4977 |
| 5119 | 5048 | 5161 | 4959 | 4922 | 4934 | 4996 | 5209 | 5101 | 5116 | 5173 |
| 5128 | 4988 | 5140 | 5064 | 5194 | 5055 | 5076 | 5145 | 5010 | 4975 | 5021 |
| 4922 | 5181 | 4955 | 5026 | 5186 | 5000 | 4952 | 5052 | 5189 | 5014 | 5210 |
| 5188 | 5041 | 5145 | 5159 | 5020 | 4965 | 4998 | 5067 | 5126 | 4969 | 4976 |

Rows 1–4: 420; Row 5: 430; Rows 6–9: 410

*FIG. 10*

TOUCH SCREEN AND METHOD OF COMPENSATING FOR DIFFERENCES IN ROUTING TRACE PATH LENGTHS

FIELD

This application relates to display devices, and more particularly to touch screen display devices (i.e., touch screens).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically utilize a display device to provide visual output related to operations occurring within and/or being performed by the information handling system. Depending on the type of information handling system, the display device can be physically connected or affixed to the system, or may be communicatively connected to the system via one or more cables and/or intermediary components (e.g., a docking station). Some display devices include a touch sensitive input device that enables a user to provide input to the information handling system through direct interaction with the display device.

A display device including a touch sensitive display device is otherwise referred to as a touch screen display device, or simply a touch screen. As known in the art, a touch screen enables a user to provide input to, or interact with, the display device or the information handling system via touch events, which are detected by components of the touch sensitive input device at precise locations on the display screen. There are many different types of touch screen technology that use different methods of sensing touch events. Examples of touch screen technology include resistive touch screens, capacitive touch screens, surface acoustic wave (SAW) touch screens, infrared touch screens and optical touch screens.

FIG. 1 is a graphical representation of a conventional touch screen display device (or simply "touch screen") 10 comprising a display screen active area (AA) 20 for display images, video content and/or user interface components, and a bezel 30 surrounding the display screen active area. The bezel 30 provides structural support for the touch screen components and/or attaches to a support structure housing the touch screen components. In conventional touch screen display device 10, bezel 30 comprises a relatively large width ($BW_L$ and $BW_R$) on the left and right sides of the display screen active area (AA) 20. In some cases, the width of the bezel 30 bordering the top and bottom sides of the display screen active area (AA) 20 may be similar to, or different than, the left and right sides of the device. In some cases, the width of the bezel 30 on one or more sides of the device may range between about 3 mm and about 15 mm.

In order to sense touch events, touch screen 10 may include a touch sensitive input device comprising a touch sensor panel (or simply "touch panel") 40, which is arranged beneath the display screen active area 20. The touch panel 40 is shown with dotted lines in FIG. 1 to show that it resides behind the display screen of the display device 10. In some cases, touch panel 40 may extend beyond the display screen active area (AA) 20, so as to avoid dead spots on or near borders of the touch screen display device 10.

FIG. 2 is a graphical representation of an exemplary touch panel 40 that may be used within the conventional touch screen display device 10 of FIG. 1. As shown in FIG. 2, touch panel 40 includes a plurality of transmit lines (or drive lines) 50 and a plurality of receive lines (or sense lines) 60. The plurality of receive 60 lines are arranged at an angle (e.g., 90°) to, and intersect with, the plurality of transmit lines 50 to form a plurality of sense nodes 70. In order to detect the presence of a finger or other object on or near one or more of the sense nodes 70, a drive signal may be supplied to one or more of the transmit lines 50 via routing traces 80/85 on the left and right sides of the touch panel 40. When a user touches a particular location on the display screen, a touch signal may be induced across one or more of the sense nodes 70 and forwarded to the touch sensitive input device via routing traces 90.

In FIG. 2, the plurality of transmit lines 50 are coupled to routing traces 80 and 85 on both the left and right sides of the touch panel 40. This type of routing configuration is referred to as a double routing trace configuration, and is commonly used in touch screen display devices, such as the touch screen 10 shown in FIG. 1. Because this type of routing configuration requires N routing traces on the left and right sides of the touch panel for N transmit lines 50, the double routing trace configuration shown in FIG. 2 consumes a significant amount of board space on either side of touch panel 40. The amount of board space consumed by the left routing traces 80, right routing traces 85 and ground ring 87 generally depends on the number (N) of transmit lines 50, and is illustrated in FIG. 2 as a left trace width ($TW_L$) and a right trace width ($TW_R$). In other cases (not shown), the plurality of transmit lines 50 may be coupled to routing traces (e.g., routing traces 80) on only one side of the touch panel 40 in a single routing trace configuration. However, this routing configuration still consumes a significant amount of board space by requiring N routing traces on the left (or right) side of the touch panel 40.

A current design trend in touch screen display devices is to reduce the border dimensions of such devices, and extend the active area of the display screen further out toward one or more edges of the display device. However, reducing border dimensions of touch screen display devices limits the available board space for routing traces from the touch panel of the display device.

SUMMARY

The following description of various embodiments of touch sensitive input devices, information handling systems and related methods is not to be construed in any way as limiting the subject matter of the appended claims.

Generally speaking, the present disclosure provides touch sensitive input devices (e.g., touch screen display devices, or touch screens), touch panels with routing trace configurations designed to reduce border dimensions of touch screen display devices, and related methods for compensating for differences in routing trace path lengths.

More specifically, the present disclosure provides an improved routing trace configuration that may be used to reduce the routing trace width on opposing sides (e.g., left and right sides, or top and bottom sides) of a touch panel of the touch sensitive input device. In addition, the present disclosure provides improved touch sensitive input devices, information handling systems and related methods, which provide accurate detection of touch event locations on the touch panel by compensating for differences in routing trace path lengths.

According to one embodiment, a touch sensitive input device according to the present disclosure may include a touch panel comprising a plurality of transmit lines and a plurality of receive lines, which are arranged with the plurality of transmit lines in a grid pattern, such that a sense node is disposed on the touch panel at each intersection of the transmit and receive lines. As described in more detail below, the touch sensitive input device may also generally include transmit circuitry, receive circuitry, a storage medium and a processing device. Although other components not specifically mentioned herein may be included within the touch sensitive input device, they are omitted from the present disclosure for purposes of brevity.

In one embodiment of the touch panel disclosed herein, a first subset of the transmit lines may be coupled to routing traces on only a first side (e.g., a left side) of the touch panel, a second subset of the transmit lines may be coupled to routing traces on only a second side (e.g., a right side) of the touch panel, and a third subset of the transmit lines may be coupled to routing traces on both the first side and the second side of the touch panel. The third subset of the transmit lines may be disposed on the touch panel between the first and second subsets of the plurality of transmit lines. In some embodiments, the plurality of receive lines may be coupled to routing traces on a third side (e.g., a bottom side or a top side) of the touch panel.

As noted above, the touch sensitive input device may include transmit circuitry and receive circuitry and a storage medium. In one embodiment, the transmit circuitry may be coupled to supply drive signals to the plurality of transmit lines via the routing traces on the first side and the second side of the touch panel, and the receive circuitry may be coupled to receive analog sense signals corresponding to each sense node on the touch panel from the routing traces on the third side of the touch panel. The receive circuitry may be generally configured to convert the analog sense signals into digital sense signals.

As noted above, the touch sensitive input device may include a storage medium and a processing device. In one embodiment, the storage medium may be coupled to the receive circuitry, and may be configured to store the digital sense signals generated by the receive circuitry in a memory table having rows and columns. In one embodiment, the memory table may include a first subset of rows containing digital sense signals corresponding to the first subset of transmit lines, a second subset of rows containing digital sense signals corresponding to the second subset of transmit lines, and a third subset of rows containing digital sense signals corresponding to the third subset of transmit lines.

The processing device may be coupled to the storage medium, and may be generally configured to execute program instructions to compensate for offsets in the digital sense signals stored within the first and second subsets of the rows in the memory table.

In one embodiment, the program instructions may include at least a first set of program instructions, a second set of program instructions and a third set of program instructions. The first set of program instructions may be executable by the processing device to determine a first offset value by determining a difference between an average value of the digital sense signals stored within the first subset of rows and an average value of the digital sense signals stored within the third subset of rows. The second set of program instructions may be executable by the processing device to determine a second offset value by determining a difference between an average value of the digital sense signals stored within the second subset of rows and the average value of the digital sense signals stored within the third subset of rows. The third set of program instructions may be executable by the processing device to compensate for offsets in the digital sense signals stored within the first and second subsets of rows in the memory table by: (a) applying the first offset value to each of the digital sense signals stored within the first subset of rows, and (b) applying the second offset value to each of the digital sense signals stored within the second subset of rows.

According to another embodiment, a method is provided herein for determining a location of a touch event on a touch panel of a touch sensitive input device. In some embodiments, the method may begin by supplying drive signals to a plurality of transmit lines disposed on a touch panel, and receiving sense signals from a plurality of receive lines disposed on the touch panel in response thereto. After digitizing the received sense signals, the method may store the digital sense signals (at least temporarily) in a memory table having rows and columns. In some embodiments, the step of storing the digital sense signals may include: (a) storing digital sense signals corresponding to a first subset of the transmit lines, which are coupled to routing traces on only a first side of the touch panel, within a first subset of the N rows in the memory table; (b) storing digital sense signals corresponding to a second subset of the transmit lines, which are coupled to routing traces on only a second side of the touch panel, within a second subset of the N rows in the memory table; and (c) storing digital sense signals corresponding to a third subset of transmit lines, which are coupled to routing traces on both the first side and the second side of the touch panel, within a third subset of the N rows in the memory table.

Next, the method may adjust the digital sense signal values stored within the memory table by determining a first offset value, determining a second offset value, and respectively applying the first and second offset values to the each of the digital signal values stored within the first and second subsets of rows in the memory table.

In some embodiments, the first offset value may be determined by determining a difference between an average value of the digital signals stored within the first subset of rows and an average value of the digital signals stored within the third subset of rows. In some embodiments, the second offset value may be determined by determining a difference between an average value of the digital signals stored within the second subset of rows and an average value of the digital signals stored within the third subset of rows.

In some embodiments, the digital sense signal values stored within the memory table may be adjusted by applying the first offset value to each of the digital signals stored within the first subset of the rows in the memory table, and by applying the second offset value to each of the digital signals stored within a second subset of the rows in the memory table. The second offset value may generally by different from the first offset value, due to the path length differences for the sense nodes associated with the second subset of transmit lines compared to the sense nodes associated with the first subset of transmit line.

In some embodiments, the method may use the adjusted digital sense signals to detect a location of a touch event on the touch panel. By respectively applying the first and second offset values to the digital sense signal values stored within the first and second subsets of the rows, the adjusted digital sense signal values become much more uniform, thereby enabling the location of the touch event on the touch panel to be detected with significantly greater accuracy.

According to another embodiment, an information handling system including a touch panel and a touch controller is provided herein. The touch panel may be configured, as generally described above. The touch controller may be coupled to the touch panel for supplying drive signals to the plurality of transmit lines, receiving sense signals corresponding to the sense nodes from the plurality of receive lines, digitizing the received sense signals and storing the digital sense signals. In addition, the touch controller may be configured to compensate for offsets in the digital sense signals corresponding to sense nodes associated with a first subset of the plurality of transmit lines and the digital sense signals corresponding to sense nodes associated with a second subset of the plurality of transmit lines. The touch controller may include transmit circuitry, receive circuitry, a storage medium and a processing device, as generally described above.

BRIEF DESCRIPTION OF THE DRAWINGS

Other advantages of the invention will become apparent upon reading the following detailed description and upon reference to the accompanying drawings in which:

FIG. 9 illustrates one embodiment of a memory table containing digital sense signals, according to one example embodiment;

FIG. 10 illustrates one embodiment of a memory table containing adjusted digital sense signals, according to one example embodiment.

Figure 1:
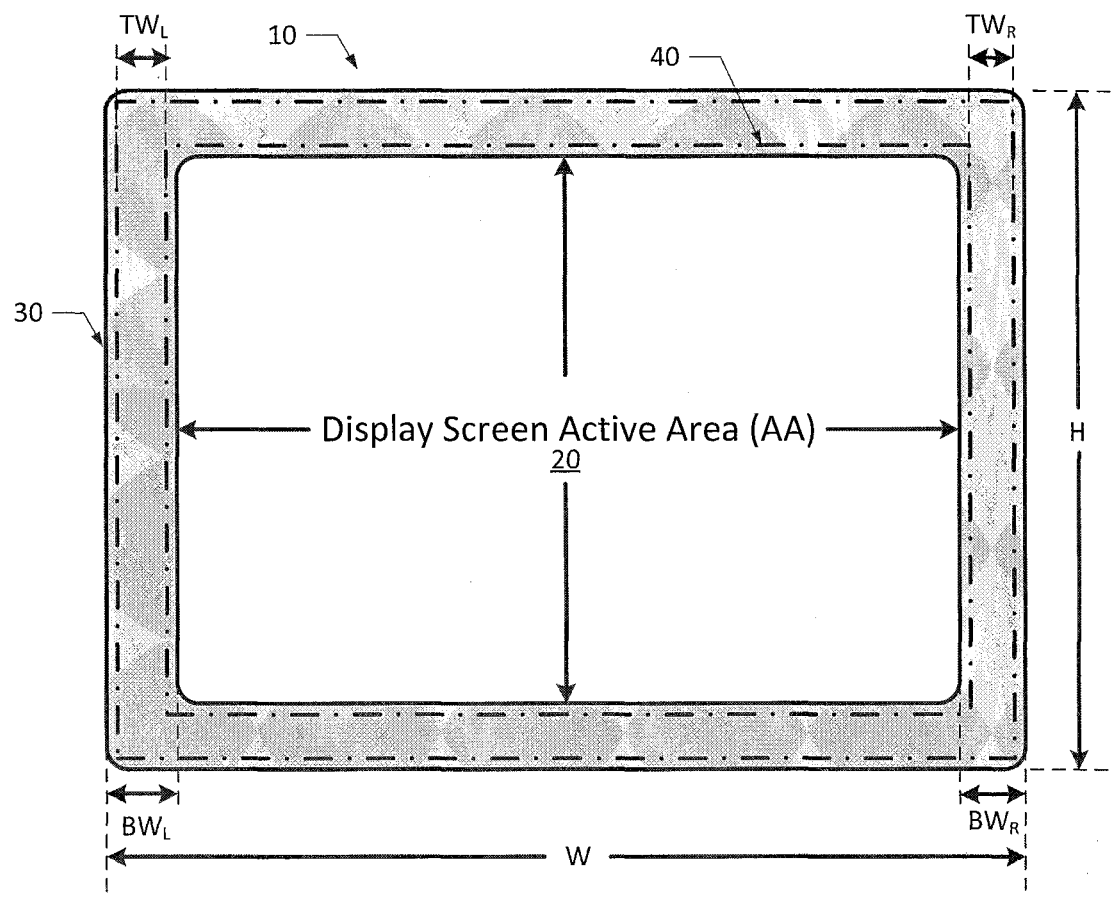
FIG. 1 (Prior Art) is a graphical representation of a conventional touch screen display device having a relatively large border width.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

As noted above, this disclosure generally relates to touch sensitive input devices, routing trace configurations designed to reduce border dimensions of such devices, and related methods for compensating for offsets in touch signals due to differences in routing trace path lengths. In some embodiments, the touch sensitive input devices described herein may be part of, or configured for use with, a variety of different information handling systems.

Figure 3:
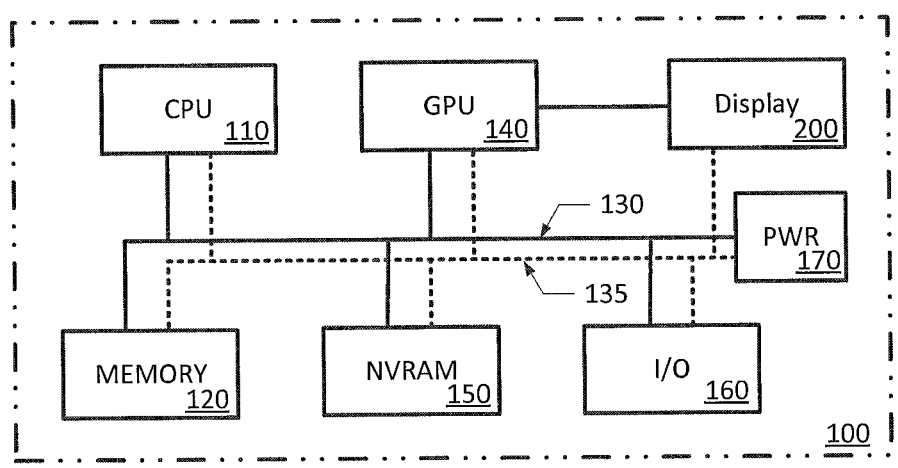
FIG. 3 is a block diagram illustrating exemplary components of an information handling system comprising, or configured for use with, a touch screen display device.

For purposes of this disclosure, an information handling system, such as information handling system 100 shown in FIG. 3, may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

With reference now to FIG. 3, there is depicted a block diagram representing a generalized embodiment of an information handling system 100 comprising and/or communicatively coupled to a display device 200. As depicted in FIG. 3, information handling system 100 may generally include one or more information handling resources. The information handling resources may include any component, system, device or apparatus of information handling system 100, including without limitation processors, busses, computer-readable media, input-output devices and/or interfaces, storage resources, network interfaces, motherboards, electro-mechanical devices (e.g., fans), and/or power supplies.

In the generalized embodiment shown in FIG. 3, information handling system 100 includes at least one central processing unit (CPU) 110, which is coupled to system memory 120 via system interconnect 130 (otherwise referred to as a system bus). Also coupled to CPU 110, via system interconnect 130, is a graphics card with a graphics processing unit (GPU) 140 located thereon, nonvolatile storage (NVRAM) 150, and one or more input/output devices 160. Input/output devices 160 may include, but are certainly not limited to, keyboards, mice, touch pads, speakers, and cameras.

Information handling system 100 requires a power source to operate the various electronic components disposed therein. The power source can be provided via an external power source (e.g., mains power) and an internal power supply regulator, and/or by an internal power source, such as a battery. As shown in FIG. 3, power management system 170 may be included within information handling system 100 for moderating the available power from the power source. The power management system 170 may be coupled to one or more components of the information handling system 100 via a power bus 135 to provide the required power, as well as to perform other power-related administrative tasks of the information handling system.

System memory 120 and/or NVRAM 150 may be generally configured to store software and/or firmware modules and one or more sets of data that can be utilized during operation of information handling system 100. In some embodiments, one or more of these software and/or firmware modules can be loaded into system memory 120 from NVRAM 150 during operation of system 100. In one embodiment, system memory 120 may include, or may be loaded with, a plurality of such modules, including one or more firmware (FW) modules, a basic input/output system (BIOS), an operating system (OS), and one or more user application(s). These software and/or firmware modules have varying functionality when their corresponding program code is executed by a main processing device (e.g., CPU 110) or a secondary processing device (e.g., GPU 140) of information handling system 100.

As noted above, information handling system 100 also includes a display device 200, which may be a part of, or communicatively coupled to, the information handling system 100. For example, display device 200 may be permanently or detachably affixed to the information handling system 100, when system 100 is a laptop computer, tablet computer, e-reader, "2 in 1" system or a mobile device (e.g., PDA or smart phone). Alternatively, display device 200 may be a stand-alone display device, which is communicatively coupled to information handling system 100 via one or more cables and/or other interfaces (e.g., a docking station), when system 100 is a desktop computer. Regardless of whether the display device is a stand-alone device, or integrated with the information handling system 100, display device 200 may be coupled to receive and/or transmit data signals from/to a processing device (e.g., CPU 110 or GPU 140) of system 110, and may be further coupled to receive power from the power management system 170 within system 100.

Generally speaking, display device 200 may be any type dynamic display capable of displaying images, video content and/or graphical user interfaces on a display screen of the display device, and may include any type of light emitting diode (LED), organic LED (OLED), liquid crystal display (LCD), electroluminescence (EL) or other display technology. Of the various types of display devices that can be provided with different information handling systems, perhaps the most common type of display device in use today is a liquid crystal display (LCD) device.

An LCD device generally includes an LCD panel comprising a layer of liquid crystals sandwiched between an upper and lower glass substrate, a color filter formed upon the upper glass substrate of the LCD panel to provide a pattern of red, green and blue (RGB) pixels, a vertically polarizing film overlaying the color filter to polarize light entering the display device, and a horizontally polarizing film formed upon the lower glass substrate to block/pass light. Since the LCD panel produces no light of its own, a backlight panel is used to illuminate the RGB pixels and create an image on a display screen of the LCD device. In some embodiments, the backlight panel may comprise an array of light sources (e.g., an array of cold cathode fluorescent lamps, CCFLs, LEDs or OLEDs) and a diffuser panel, which are positioned behind the LCD panel for providing evenly diffused illumination to the LCD panel. In other embodiments, the backlight panel may include light sources (e.g., CCFLs, LEDs or OLEDs) along two or more side edges of the display device that are positioned for emitting light into a light guide plate (LGP) or diffuser panel. The LGP and edge-mounted light sources may be arranged behind the LCD panel for providing evenly diffused illumination thereto.

Regardless of the type of display technology used (e.g., LCD, LED, OLED, EL, etc.), display device 200 preferably includes a touch sensitive input device that enables a user to provide input to the information handling system 100 through direct interaction with the display device. As noted above, a display device comprising a touch sensitive input device (i.e., a touch screen display device, or simply "touch screen") enables a user to provide input to, or interact with, display device 200 or information handling system 100 via touch events, which are detected by components of the touch sensitive input device at precise locations on the touch screen.

Figure 4:
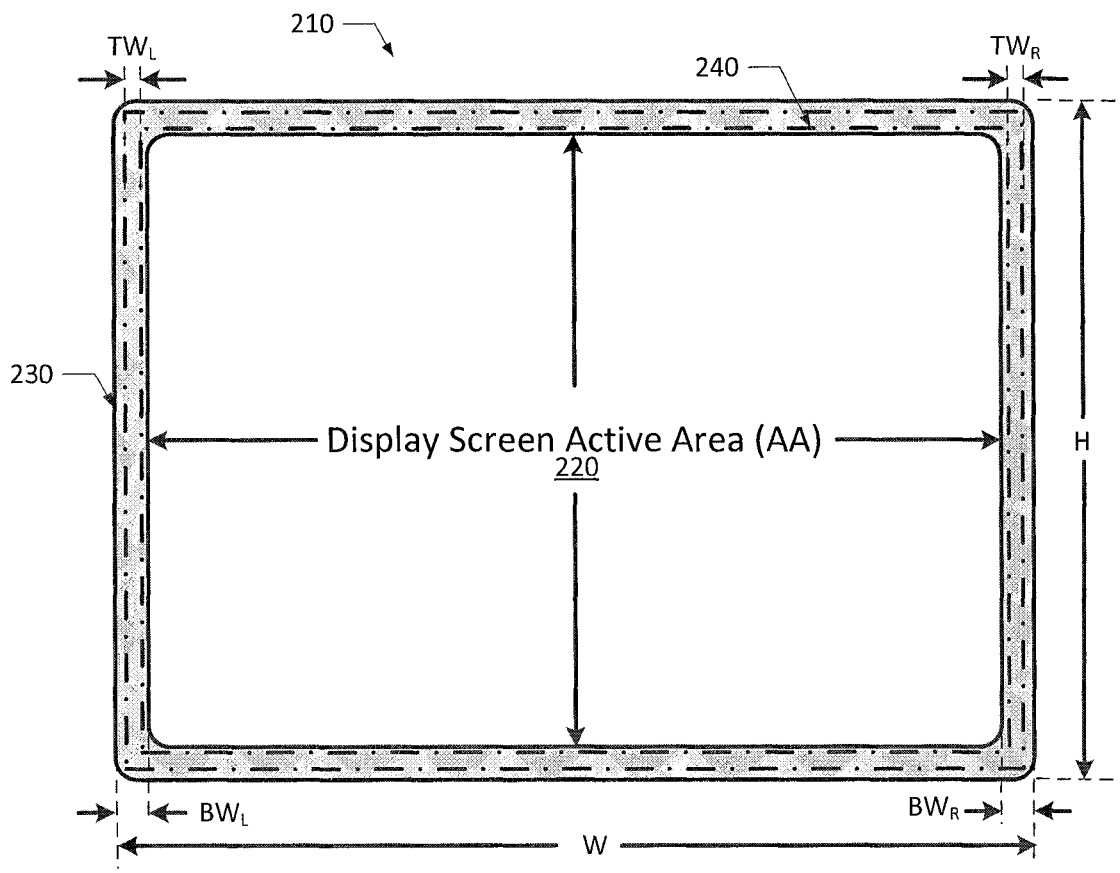
FIG. 4 is a graphical representation of a touch screen display device having a relatively small border width, according to one exemplary embodiment.

FIG. 4 is a graphical representation of a touch screen display device 210 comprising a display screen active area (AA) 220 for display images, video content and/or user interface components, a bezel 230 surrounding the display screen active area 220, and a touch sensitive input device comprising a touch sensor panel (or simply "touch panel") 240 that overlaps at least part of the display screen active area 220. Similar to bezel 30, bezel 230 may provide structural support to the display device components and/or may attach to a support structure housing the display device components. Touch panel 240 is depicted with dotted lines in FIG. 4 to show that it resides behind the display screen of the touch screen display device 200. As described in more detail below with reference to FIG. 5, the presence of a finger (or other object) near touch panel 240 may enable the touch sensitive input device to detect a touch event at a precise location on the display screen. In some embodiments, touch panel 240 may encompass as much of the display screen active area 220 as possible, so as to avoid dead spots (i.e., locations where touch events cannot be detected) on or near borders of the display screen active area 220.

As noted above, a current design trend in touch screen display devices is to reduce the border dimensions of such devices, and extend the active area of the display screen further out toward one or more edges of the display device.

As shown by a comparison of FIGS. 1 and 4, bezel 230 is depicted with a comparatively smaller width ($BW_L$ and $BW_R$) on the left and right sides of display screen active area (AA) 220 than bezel 30 of touch screen display device 10 of FIG. 1. In some embodiments, the width of the bezel 230 on the top and bottom of display device 200 may be similar to, or different than, the left and right sides of the device. In some embodiments, the width of the bezel 230 on one or more sides of the device may be about 3 mm or less.

Reducing the border dimensions of a touch screen display device, such as touch screen 200, allows the display screen active area (AA) 220 to be extended further out toward edges of the display device, thereby resulting in a comparatively larger display screen without increasing the overall dimensions of the display device. In other words, although touch screen display devices 100 and 200 may be confined to the same width (W) and the same height (H), bezel 230 provides a substantially smaller border width ($BW_L$ and $BW_R$) than bezel 30, thus resulting in a comparatively larger display screen active area 220. Unfortunately, reducing the border dimension(s) of a touch screen display device limits the board space available for routing traces from touch panel 240 to other components of the touch sensitive input device.

Figure 5:
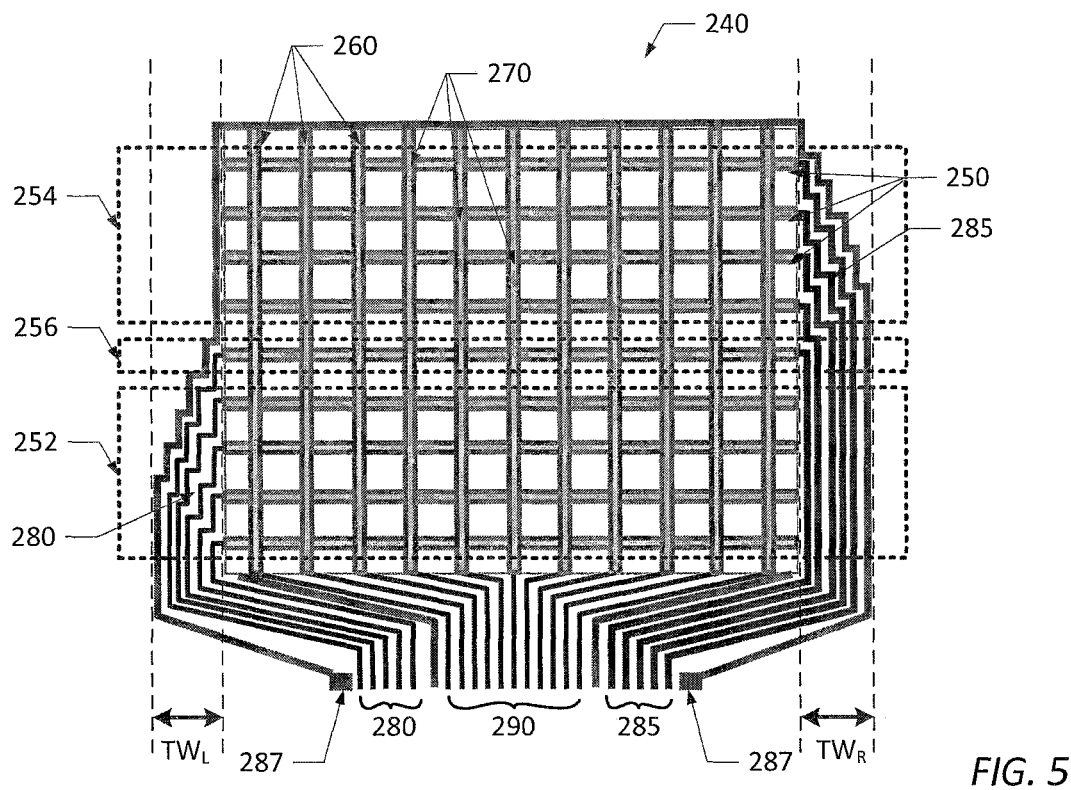
FIG. 5 is a graphical representation of an exemplary touch panel and routing trace configuration, according to one embodiment of the present disclosure, that may be used within the touch screen display device of FIG. 4.

FIG. 5 is a graphical representation of an exemplary touch panel 240 that may be used within the touch screen display device 210 of FIG. 4. As shown in FIG. 5, touch panel 240 includes a plurality of transmit lines (or drive lines) 250 and a plurality of receive lines (or sense lines) 260. According to one embodiment, transmit lines 250 and receive lines 260 may comprise a transparent conductive medium, such as Indium Tin Oxide (ITO) or Antimony Tin Oxide (ATO), formed on opposing sides of an insulating layer. Other transparent conductive mediums may be used in other embodiments.

As shown in FIG. 5, the plurality of receive lines 260 are arranged at an angle (e.g., 90°) to the plurality of transmit lines 250, such that a sense node 270 is formed at the "intersection" of each transmit line 250 and receive line 260. Although the transmit lines 250 and receive lines 260 are illustrated as straight lines in FIG. 5, it is understood that transmit lines 250 and/or receive lines 260 may be implemented with alternative geometries. It is further understood that although transmit lines 250 and receive lines 260 are depicted as being substantially perpendicular to each other, they may be arranged at angles other than 90°, as long as they "intersect" (i.e., cross over each other in vertically spaced planes) to form sense nodes 270.

In order to detect the presence of a finger (or other object) near one or more of the sense nodes 270, a drive signal is supplied to one or more of the transmit lines 250 via routing traces 280/285 on the left and right sides of the touch panel 240, which causes a signal charge to be injected into the receive lines 260 and a capacitance ($C_{sig}$) to be generated at each sense node 270. The capacitance can appear as a stray capacitance when the transmit lines are held at direct current (DC) levels, and as a mutual signal capacitance when the transmit lines are stimulated with an alternating current (AC) signal. When a user touches a particular location on the display screen, a touch event may be detected at one or more of the sense nodes 270 by detecting a change in the signal charge caused by a change in the capacitance ($C_{sig}$) induced across the sense nodes 270. As described in more detail below, the signal charges injected into receive lines 260 may be forwarded to the touch sensitive input device via routing traces 290 as analog "sense signals."

Figure 2:
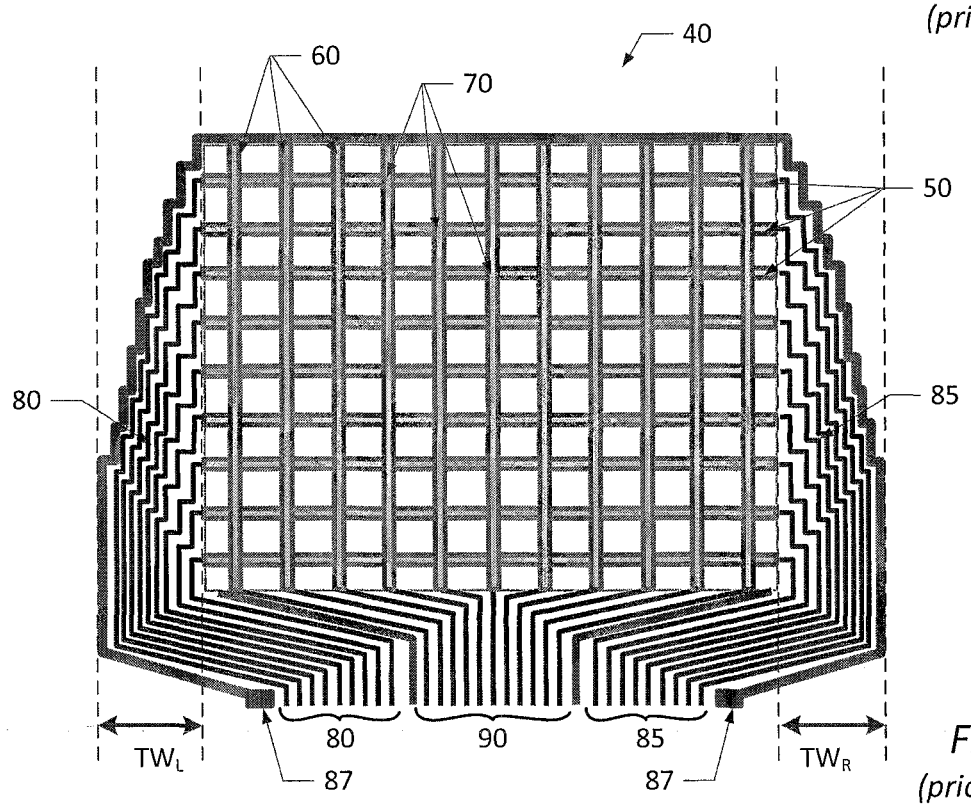
FIG. 2 (Prior Art) is a graphical representation of an exemplary touch panel and routing trace configuration that may be used within the conventional touch screen display device of FIG. 1.

As noted above, the conventional double routing trace configuration shown in FIG. 2 requires N number of routing traces on both the left and right sides of touch panel 40 for driving the same number (N) of transmit lines 50. Because the relatively large trace width on the left and right sides ($TW_L$ and $TW_R$) of touch panel 40 consumes a significant amount of board space, the conventional double trace routing configuration shown in FIG. 2 cannot be used within touch screen display devices with reduced border dimensions, such as the display device 210 shown in FIG. 4. As such, an alternative routing trace configuration is needed for such devices.

FIG. 5 illustrates one embodiment of an alternative routing trace configuration that may be used within a touch screen display device having reduced border dimensions. Unlike conventional routing methods, the routing trace configuration shown in FIG. 5 combines both single routing and double routing methods on the same touch panel 240 to reduce the left and right trace widths ($TW_L$ and $TW_R$) on the touch panel, thereby enabling smaller border dimensions ($BW_L$ and $BW_R$) for the touch screen display device 200. As described in more detail below, the routing trace configuration shown in FIG. 5 significantly reduces the trace width on both the left and right sides ($TW_L$ and $TW_R$) of touch panel 240, compared to the conventional double routing trace configuration shown in FIG. 2.

In the exemplary embodiment shown in FIG. 5, a first subset 252 of the transmit lines 250 are coupled to routing traces 280 on only a first side of the touch panel 240 (e.g., to provide single routing to the first subset on the left side only), a second subset 254 of the transmit lines 250 are coupled to routing traces 285 on only a second side of the touch panel (e.g., to provide single routing to the second subset on the right side only), and a third subset 256 of the transmit lines 250 are coupled to routing traces 280/285 on both the first side and the second side of the touch panel 240 (e.g., to provide double routing to the third subset on both the left and right sides). The third subset 256 of the transmit lines 250 are preferably disposed on touch panel 240 between the first and second subsets 252 and 254 of the transmit lines for reasons discussed below. In some embodiments, receive lines 260 may be coupled to routing traces 290 on a third side (e.g., a bottom side or a top side) of the touch panel 240. It is noted, however, that alternative routing configurations may be used for receive lines 260. A ground ring 287 encircles a periphery of touch panel 240 and routing traces 20/285, as shown in FIG. 5.

Although a particular number (e.g., 9) of transmit lines 250 and a particular number (e.g., 11) of receive lines 260 are illustrated in FIG. 5, it is noted that the figures are not drawn to scale; a reduced number of transmit and receive lines are shown merely for drawing clarity. Generally speaking, the number of transmit lines 250 and receive lines 60 included on touch panel 240 may depend on a variety of factors including, but not limited to, one or more dimensions (e.g., height and/or width) of the display screen active area (AA) 220, desired touch screen sensitivity (e.g., a desired number of sense nodes 270 within AA 220), trace width (e.g., the width of the transmit and receive lines) and trace pitch (e.g., the trace width plus the gap between the transmit and receive line traces). According to one particular embodiment, touch panel 240 may include 46 transmit lines and 72 receive lines for an exemplary display screen active area (AA) 220 height of about 15.6 inches, a trace width of about 20 μm and a trace pitch of about 45 μm. However, touch panel 240 is not restricted to such values, and may include a different number of transmit and receive lines in other embodiments.

To reduce the trace widths ($TW_L$ and $TW_R$) on both the left and right sides of the touch panel 240, one-half of the total number of transmit lines (e.g., first subset 252) are coupled to routing traces on the left side of the touch panel 240, while the other half (e.g., second subset 254) is coupled to routing traces on the right side of the touch panel. In the example embodiment provided above, the first and second subsets 252/254 of transmit lines may each include 23 transmit lines to provide a total number of 46 transmit lines. As noted above, a third subset 256 of transmit lines disposed between the first and second subsets 252 and 254 is coupled to routing traces on both the right and left sides of the touch panel 240. The third subset 256 of transmit lines may generally include one or more transmit lines. In one particular embodiment, the third subset 256 of transmit lines includes 3 transmit lines, although an alternative number of transmit lines may be used in other embodiments.

According to one embodiment, the routing method shown in FIG. 5 may reduce the left and right side trace widths ($TW_L$ and $TW_R$) each by approximately 0.9 mm for an exemplary display screen active area (AA) 220 height of about 15.6 inches, a total of 46 transmit lines, a trace width of about 20 µm and a trace pitch of about 45 µm. It should be understood that alternative left and right trace widths ($TW_L$ and $TW_R$) can be achieved for other screen dimensions, number of transmit lines, trace widths and trace pitches using the routing method shown in FIG. 5. In some embodiments, a similar routing method may be used on the top and/or bottom sides of touch panel 240 to reduce the trace widths on the top and/or bottom sides.

As described in more detail below, the third subset 256 of transmit lines may be added to touch panel 240 to compensate for offsets in the sense signals detected from the touch panel due to differences in path lengths attributed to the routing traces 280/285 coupled to the first and second subsets 252/254 of transmit lines. As used herein, the path length is defined as the distance between a particular transmit channel and a particular receive channel of the touch sensitive input device.

Each sense node 270 on touch panel 240 has an inherently different path length, and thus, a different sense signal level associated therewith. However, due to the particular routing configuration shown in FIG. 5, sense nodes associated with the first subset 252 of transmit lines may have a significantly shorter path length than sense nodes associated with the second subset 254 of transmit lines. This path length difference may cause the receive circuitry of the touch sensitive input device to detect significantly smaller sense signals from sense nodes associated with the first subset 252, compared to sense nodes associated with the second subset 254 of transmit lines. The opposite would be true, if the first subset 252 of transmit lines were coupled to routing traces on the right side, and the second subset 254 of transmit lines were coupled to routing traces on the left side of the touch panel 240. As described in more detail below, the average sense signal level detected from the sense nodes associated with the third subset 256 of transmit lines may fall somewhere in between the average sense signal levels detected from the sense nodes associated with the first and second subsets 252/254 of transmit lines. The touch sensitive input device may use this information to adjust the sense signals detected from the sense nodes associated with the first and second subsets 252/254 of transmit lines to improve sense signal uniformity across all sense nodes 270.

Figure 6:
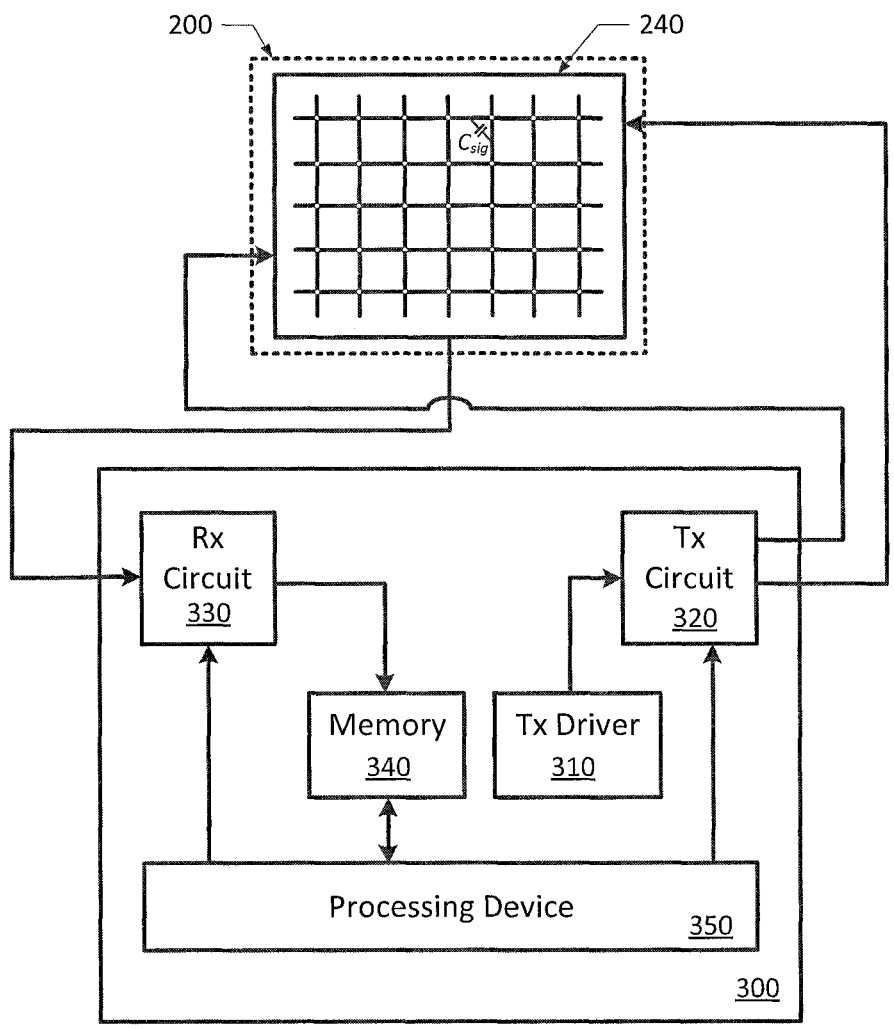
FIG. 6 is a block diagram illustrating exemplary components of a touch sensitive input device including a touch screen display device, a touch panel and a touch controller, according to one embodiment of the present disclosure.

FIG. 6 illustrates a block diagram of a display device 200 including exemplary components of a touch sensitive input device, such as touch panel 240 and touch controller 300.

Touch panel 240 utilizes a routing trace configuration, which combines both single routing and double routing methods on the same touch panel. Although a particular routing configuration is shown in FIG. 5, it is noted that other routing trace configurations, which combine single and double routing methods on the same touch panel may be used without departing from the scope of the present disclosure.

As shown in FIG. 6, touch controller 300 may generally include transmit (Tx) driver 310, transmit circuitry 320, receive (Rx) circuitry 330, storage medium 340 and processing device 350. The touch controller components shown in FIG. 6 may be implemented in hardware, software, firmware or any combination thereof. According to one embodiment, touch controller 300 may be implemented as an application specific integrated circuit (ASIC), a field programmable gate array (FPGA), a microcontroller unit (MCU), a central processing unit (CPU) or another processing device. In some embodiments, touch controller 300 may comprise, or be configured to execute, software and/or firmware to perform one or more of the operations noted herein.

Transmit circuitry 320 may be coupled to the routing traces on the left and right sides of touch panel 240 for supplying the drive signals to the plurality of transmit lines. In some embodiments, transmit driver 310 may be included to generate the supply voltage for transmit circuitry 320, and may be a charge pump, in one example. Although the transmit driver 310 is illustrated as a separate component in FIG. 6, the transmit driver 310 may be included within the transmit circuitry 320 in other embodiments. In general, the drive signals supplied to the plurality of transmit lines 250 by transmit circuitry 320 may comprise substantially any amplitude, frequency, phase, waveform or level. In some embodiments, substantially uniform drive signals may be supplied to all transmit lines. In other embodiments, the drive signals supplied to one or more of the transmit lines may differ in amplitude, frequency, phase, waveform and/or level. In some embodiments, processing device 350 may control the generation and/or application of the drive signals to the transmit lines.

Figure 7:
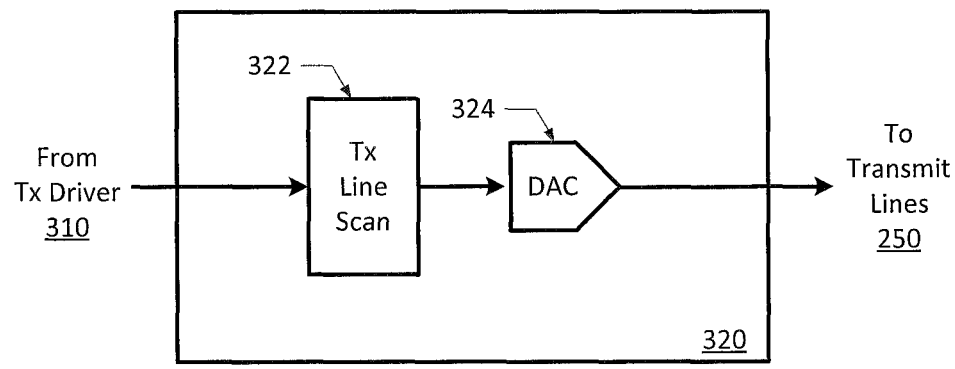
FIG. 7 is a block diagram illustrating one embodiment of transmit circuitry that may be included within the touch controller of FIG. 6.

FIG. 7 illustrates a block diagram of transmit circuitry 320, according to one embodiment. As shown in FIG. 7, transmit circuitry 320 may include transmit line scan circuitry 322 and digital to analog converter (DAC) 324. Transmit line scan circuitry 322 is configured to generate the drive signals and to selectively apply the drive signals to one or more of the transmit lines. DAC 324 converts the digital drive signals generated by transmit line scan circuitry 322 into analog drive signals before they are selectively applied to the one or more of the transmit lines.

Figure 8:
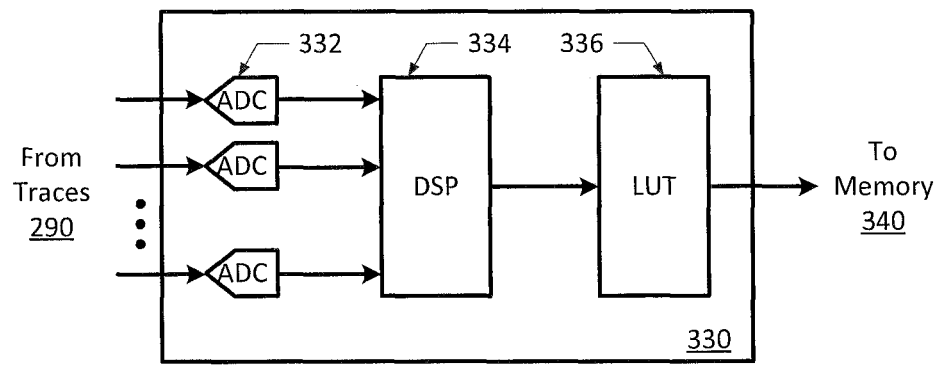
FIG. 8 is a block diagram illustrating one embodiment of receive circuitry that may be included within the touch controller of FIG. 6.

Receive circuitry 330 may be coupled to the routing traces on the bottom (and/or the top) of touch panel 240 for receiving the analog sense signals (e.g., charge signals) from the plurality of receive lines. FIG. 8 illustrates a block diagram of receive circuitry 330, according to one embodiment. As shown in FIG. 8, receive circuitry 330 may include a plurality of analog to digital converters (ADC) 332, a digital signal processor (DSP) 334, and a look up table (LUT) 336, in one embodiment. The ADCs 332 may be generally configured for receiving the analog sense signals from routing traces 290 (see, FIG. 5) and for converting the analog sense signals into digital sense signals. The digital signal processor (DSP) 334 receives the digital sense signals from the ADCs 332 and determines average values for the digit sense signals corresponding to the sense nodes in the first, second and third subsets 252/254/256 of transmit lines. More specifically, DSP 334 may determine a first average value for the digit sense signals corresponding to the sense nodes in the first subset 252 of transmit lines, a second average value for the digit sense signals corresponding to the sense nodes in the second subset 254 of transmit lines, and a third average value for the digit sense signals corresponding to the sense nodes in the third subset 256 of transmit lines. The first, second and third average values may be stored in look up table (LUT) 336 and may be used to compensate for offsets in the digital sense signals corresponding to the sense nodes in the first subset 252 and second subset 254 of transmit lines, as discussed in more detail below. In some embodiments, processing device 350 may control the receipt of the analog sense signals and/or the generation of the digital sense signals.

In some embodiments, the digital sense signals generated by ADC 332 may be stored (at least temporarily) within storage medium 340, which is coupled to receive circuitry 330 and processing device 350. Although illustrated as a separate component of touch controller 300 in FIG. 6, storage medium 340 may alternatively be included within receive circuitry 330 or within processing device 350. In general, storage medium 340 may be configured to store the digital sense signals in a memory table having rows and columns. FIG. 9 illustrates one exemplary embodiment of such a memory table.

In one embodiment, storage medium 340 may include a memory table of N rows and M columns for storing N×M digital sense signals associated with the sense nodes of the touch panel. However, storage of the digital sense signals is not limited to a memory table. In other embodiments, the digital sense signals may be stored sequentially or randomly. In FIG. 9, memory table 400 is illustrated as having N=9 rows and M=11 columns for storing the N×M=99 digitals sense signals associated with sense nodes 270 of the touch panel 240 shown in FIG. 5. It is noted, however, that the number N of rows and the number M of columns depicted in memory table 400 has been reduced for purposes of drawing clarity. In general, the memory table will include the same number rows and columns as the number of transmit and receive lines included within the touch panel. In the example provided above, touch panel 240 may include 46 transmit lines and 72 receive lines, resulting in 3312 sense nodes. In such an example, the memory table may include 46 rows and 72 columns for storing 3312 digital sense signals corresponding to the 3312 sense nodes of the touch panel.

As shown in FIG. 9, the N rows of the memory table 400 may be divided into a first subset 410, a second subset 420 and a third subset 430 of rows. The first subset 410 of rows includes digital sense signals corresponding to sense nodes associated with the first subset 252 of transmit lines 250 (see, FIG. 5). The second subset 420 of rows includes digital sense signals corresponding to sense nodes associated with the second subset 254 of transmit lines 250. The third subset 430 of rows includes digital sense signals corresponding to sense nodes associated with the third subset 256 of transmit lines.

As shown in FIG. 9, the digital sense signals stored within the first subset 410 of rows include substantially smaller values (e.g., values ranging between about 4300 and about 4600, in one embodiment) than the values of the digital sense signals stored within the second subset 420 of rows (e.g., values ranging between about 4900 and about 5200, in one embodiment). This is due, at least in part, to the routing configuration shown in FIG. 5, which causes the sense nodes associated with the first subset 252 of transmit lines to have a significantly shorter path length than the sense nodes associated with the second subset 254 of transmit lines. On the other hand, the digital sense signals stored within the third subset 430 of rows include substantially larger values (e.g., values ranging between about 5300 and about 5600, in one embodiment) than the digital signals stored within the first subset 410 and the second subset 420 of rows. This is because the double routing method used for the third subset 256 of transmit lines increases the path length of the sense nodes associated with the third subset 256 of transmit lines.

According to one exemplary embodiment, a first average value of the digital sense signals stored within the first subset 410 of rows may be approximately 4400, a second average value of the digital sense signals stored within the second subset 420 of rows may be approximately 5000, and a third average value of the digital sense signals stored within the third subset 430 of rows may be approximately 5200. According to one embodiment, the first, second and third average values may be stored within LUT 336, as shown in FIG. 8 and described above. It is noted, however, that the first, second and third average values may not be stored within a LUT 336 of the receive circuitry 350 in all embodiments, and may be stored elsewhere or generated on the fly, in other embodiments. It is further noted the values of the digital sense signals shown in FIG. 9, and the average values thereof, are merely exemplary and used for illustrative purposes only. In some cases, the differences or offsets between the digital sense signal values stored within the first subset 410 and the second subset 420 of rows (e.g., an average offset value of approximately 600, in one embodiment) may cause the touch sensitive input device to incorrectly determine the location of a touch event on the touch panel 240. As such, a method is needed to compensate for such offsets, so that the location of a touch event can be precisely determined.

As shown in FIG. 6, processing device 350 is coupled to storage medium 340. According to one embodiment, processing device 350 may comprise, or be configured to execute, program instructions to implement a method to compensate for the offsets in the digital sense signal values stored within the first subset 410 and the second subset 420 of the rows in memory table 400 (or another memory table comprising N rows and M columns, as discussed above with respect to FIG. 5). One embodiment of such a method is depicted in steps 640-670 of the flow chart diagram shown in FIG. 11 and described in more detail below.

According to one embodiment, processing device 350 may comprise, or be configured to execute, a first set of program instructions to determine a first offset value by determining a difference between an average value of the digital sense signals stored within the first subset 410 of rows (e.g., a first average value of about 4400) and an average value of the digital sense signals stored within the third subset 430 of rows (e.g., a third average value of about 5200). In the example provided above, the first offset value may be 5200−4400=800. Processing device 350 may further comprise, or be configured to execute, a second set of program instructions to determine a second offset value by determining a difference between an average value of the digital sense signals stored within the second subset 420 of rows (e.g., a second average value of about 5000) and the average value of the digital sense signals stored within the third subset 430 of rows (e.g., the third average value of about 5200). In the example provided above, the second offset value may be 5200−5000=200.

Once the first and second offset values are determined, processing device 350 may comprise, or be configured to execute, a third set of program instructions to adjust the values of the digital sense signals stored within the first and second subsets 410/420 of rows in the memory table by applying (e.g., adding) the first offset value (e.g., 800) to each of the digital sense signal values stored within the first subset 410 of rows, and applying the second offset value (e.g., 200) to each of the digital sense signal values stored within the second subset 420 of rows. In some embodiments, the adjusted digital sense signal values may be updated within memory table 400, or may be stored (at least temporarily) within another memory table within storage medium 340. FIG. 10 illustrates one exemplary embodiment of such a memory table.

Like memory table 400 of FIG. 9, memory table 500 of FIG. 10 may generally include N rows and M columns for storing the N×M digital sense signals associated with the sense nodes of the touch panel. Although illustrated in FIG. 10 as having N=9 rows and M=11 columns for storing N×M=99 digitals sense signals associated with the sense nodes 270 of the touch panel 240 shown in FIG. 5, memory table 500 is not restricted to such an implementation, and will generally include the same number rows and columns as the number of transmit and receive lines included within the touch panel.

As shown in FIG. 10, the adjusted digital sense signal values stored within memory table 500 are significantly more uniform than the digital sense signal values stored within memory table 400. According to one embodiment, the average value of the digital sense signals stored within the first subset 410, the second subset 420 and the third subset 430 of rows may be approximately 5200. In some embodiments, processing device 350 may be further configured to execute program instructions to detect a location of a touch event on the touch panel based on the adjusted digital sense signal values stored within memory table 500. Because the adjusted digital sense signal values stored within memory table 500 are relatively uniform across all sense nodes, the location of the touch event can be more accurately determined.

According to one embodiment, the compensation method performed by processing device 350 may be embodied, at least in part, in a computer readable storage medium containing computer readable code, such that a series of steps are performed when the computer readable code is executed on the processing device. The computer readable storage medium may be storage medium 340, or another storage medium included within touch controller 300, display device 200 or information handling system 100. The computer readable storage medium may be implemented as substantially any non-transitory computer readable storage medium, including but not limited to, a direct access storage device (e.g., a hard disk drive), random access memory (RAM), read-only memory (ROM), electrically erasable programmable read-only memory (EEPROM), and/or flash memory. The computer readable code, or program instructions, used to implement the compensation method described herein may be written in any combination of one or more programming languages, including an object oriented programming language, without limitation.

In some embodiments, the computer program instructions may be provided to processing device 350 of touch controller 300 for execution, as set forth above. In other embodiments, the computer program instructions may instead be provided to a processing device of display device 200 (such as a display controller or other host processor), a processing device of information handling system 100 (such as a display controller, a central processing unit, CPU, or a graphics processing unit, GPU), or another programmable data processing apparatus to produce a machine, such that the program instructions, which execute via the processing device of the display device or information handling system, performs the methods described herein.

Figure 11:
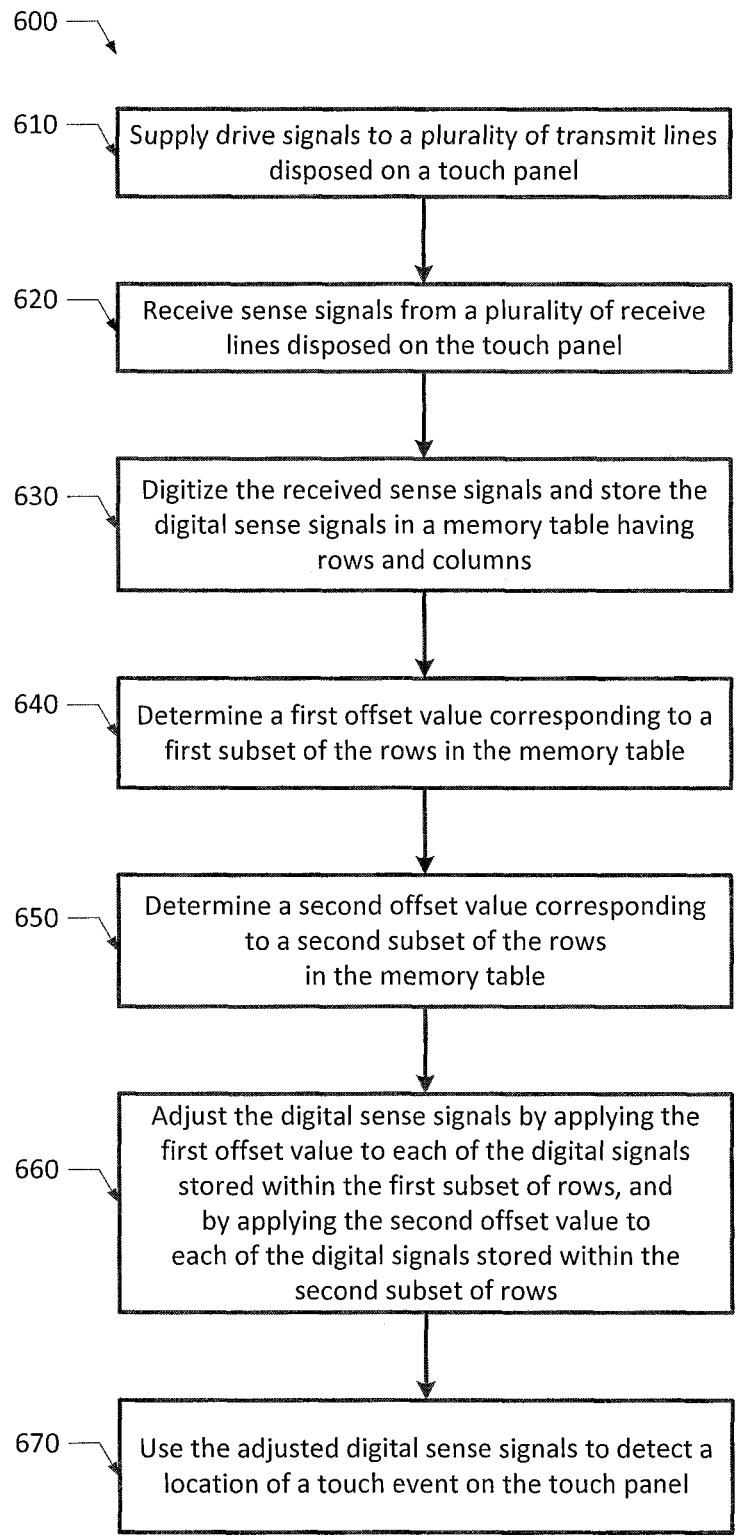
FIG. 11 is a flow chart diagram illustrating one embodiment of a method that may be performed by the touch sensitive input device of FIG. 6 to determine a location of a touch event on a touch panel of the touch sensitive input device.

FIG. 11 illustrates one embodiment of a method 600 that may be performed by the touch sensitive input device shown in FIG. 6 to determine a location of a touch event on a touch panel of the touch sensitive input device. Although all method steps shown in FIG. 11 are performed in at least one embodiment, the touch sensitive input device shown in FIG. 6 may not perform all method steps in all embodiments; moreover, fewer, additional and/or alternative steps may be performed in other embodiments. In some embodiments, one or more of the method steps shown in FIG. 11 may be performed by, or under the control of, other components of display device 200 or information handling system 100.

According to one embodiment, method 600 may begin in step 610 by supplying drive signals to a plurality of transmit lines disposed on a touch panel, such as transmit lines 250 of the touch panel 240 shown in FIG. 5. In one embodiment, transmit circuitry 320 of touch controller 300 may be configured to supply the drive signals to the plurality of transmit lines in step 610 via routing traces 280/285. As noted above, the drive signals may comprise substantially any amplitude, frequency, phase, waveform or level.

In step 620, method 600 may receive sense signals from a plurality of receive lines disposed on the touch panel, such as receive lines 260 of the touch panel 240 shown in FIG. 5. As noted above, a signal charge may be injected into the receive lines 260 and a capacitance ($C_{sig}$) may be generated at each sense node 270 when drive signals are supplied to the transmit lines 250. The signal charges injected into the receive lines 260 may be forwarded to the touch sensitive input device via routing traces 290 as analog "sense signals."

In step 630, method 600 may digitize the received sense signals and store the digital sense signals (at least temporarily) in a memory table having rows and columns, such as memory table 400 of FIG. 9. As noted above, the memory table may generally include N rows and M columns for storing N×M digital sense signals associated with the sense nodes of a touch panel. In some embodiments, step 630 may include: (a) storing digital sense signals corresponding to a first subset of the transmit lines (e.g., first subset 252 of transmit lines, FIG. 5), which are coupled to routing traces on only a first side of the touch panel, within a first subset of the N rows in the memory table (e.g., first subset 410 of rows, FIG. 9); (b) storing digital sense signals corresponding to a second subset of the transmit lines (e.g., second subset 254 of transmit lines, FIG. 5), which are coupled to routing traces on only a second side of the touch panel, within a second subset of the N rows in the memory table (e.g., second subset 420 of rows, FIG. 9); and (c) storing digital sense signals corresponding to a third subset of transmit lines (e.g., third subset 256 of transmit lines, FIG. 5), which are coupled to routing traces on both the first side and the second side of the touch panel, within a third subset of the N rows in the memory table (e.g., third subset 430 of rows, FIG. 9).

In steps 640-660, method 600 may adjust the digital sense signal values stored in the memory table by determining a first offset value in step 640, determining a second offset value in step 650, and respectively applying the first and second offset values to the each of the digital signal values stored within the first and second subsets of rows in the memory table in step 660.

In some embodiments, the first offset value may be determined in step 640 by determining a difference between a first average value of the digital signals stored within the first subset of rows and a third average value of the digital signals stored within the third subset of rows. In the example provided above, the first offset value was determined to be 5200−4400=800.

In some embodiments, the second offset value may be determined in step 650 by determining a difference between a second average value of the digital signals stored within the second subset of rows and the third average value of the digital signals stored within the third subset of rows. In the example provided above, the second offset value was determined to be 5200−5000=200.

In some embodiments, the digital sense signal values stored within the memory table may be adjusted in step 660 by applying the first offset value (e.g., 800) to each of the digital signals stored within the first subset of the rows in the memory table (e.g., first subset 410 of rows, FIG. 9), and by applying the second offset value (e.g., 200) to each of the digital signals stored within a second subset of the rows in the memory table (e.g., second subset 420 of rows, FIG. 9). The second offset value will generally be different from the first offset value, due to the path length differences for the sense nodes associated with the second subset of transmit lines compared to the sense nodes associated with the first subset of transmit lines.

In step 670, method 600 may use the adjusted digital sense signals to detect a location of a touch event on the touch panel. By respectively applying the first and second offset values to the digital sense signal values stored within the first and second subsets of the rows in step 660, the adjusted digital sense signal values become much more uniform, thereby enabling the location of the touch event on the touch panel to be detected with significantly greater accuracy.

While the present disclosure may be adaptable to various modifications and alternative forms, specific embodiments have been shown by way of example and described herein. However, it should be understood that the present disclosure is not intended to be limited to the particular touch sensitive input device, display device, information handling system and/or methods disclosed and illustrated herein. Rather, the present disclosure is intended to cover all modifications, equivalents, and alternatives falling within the spirit and scope of the present disclosure as defined by the appended claims.

In some implementations, certain steps of the methods described herein may be combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence of steps is therefore, not to be taken in a limiting sense, and the scope of the present disclosure is defined only by the appended claims. Furthermore, certain changes may be made with regard to the touch sensitive input device, display device and/or the information handling system without departing from the spirit or scope of the present disclosure. Thus, the present disclosure is not limited to only those embodiments shown and described herein, and may include other embodiments and/or combinations of embodiments.

What is claimed is:

1. A touch sensitive input device comprising:
a touch panel including a plurality of transmit lines and a plurality of receive lines arranged with the plurality of transmit lines in a grid pattern, such that a sense node is disposed on the touch panel at each intersection of the transmit and receive lines;
  wherein a first subset of the transmit lines are coupled to routing traces on only a first side of the touch panel;
  wherein a second subset of the transmit lines are coupled to routing traces on only a second side of the touch panel; and
  wherein a third subset of the transmit lines are coupled to routing traces on both the first side and the second side of the touch panel; and
a processing device configured to execute program instructions to compensate for offsets in digital signals corresponding to sense nodes associated with the first subset of transmit lines and sense nodes associated with the second subset of transmit lines, wherein the program instructions comprise:
  a first set of program instructions executable to determine a first offset value by determining a difference between an average value of the digital signals corresponding to sense nodes associated with the first subset of transmit lines and an average value of digital signals corresponding to sense nodes associated with the third subset of transmit lines; and
  a second set of program instructions executable to determine a second offset value by determining a difference between an average value of the digital signals corresponding to sense node associated with the second subset of transmit lines and an average value of the digital signals corresponding to sense nodes associated with the third subset of transmit lines.

2. The touch sensitive input device as recited in claim 1, wherein the third subset of the transmit lines is disposed on the touch panel between the first and second subsets of the plurality of transmit lines.

3. The touch sensitive input device as recited in claim 1, wherein the plurality of receive lines are coupled to routing traces on a third side of the touch panel.

4. The touch sensitive input device as recited in claim 3, further comprising transmit circuitry coupled to supply drive signals to the plurality of transmit lines via the routing traces on the first side and the second side of the touch panel.

5. The touch sensitive input device as recited in claim 3, further comprising:
receive circuitry coupled to receive analog signals corresponding to each sense node on the touch panel from the routing traces on the third side of the touch panel, wherein the receive circuitry is configured to convert the analog signals into digital signals; and
a storage medium coupled to the receive circuitry and configured to store the digital signals in a memory table having rows and columns, wherein:
  a first subset of the rows comprises the digital signals corresponding to the sense node associated with the first subset of transmit lines;
  a second subset of the rows comprises the digital signals corresponding to the sense node associated with the second subset of transmit lines; and
  a third subset of the rows comprises the digital signals corresponding to the sense node associated with the third subset of transmit lines.

6. The touch sensitive input device as recited in claim 5, wherein the processing device is coupled to the storage medium and configured to execute:
the first set of program instructions to determine the first offset value by determining a difference between an average value of the digital signals stored within the first subset of rows and an average value of the digital signals stored within the third subset of rows;
the second set of program instructions to determine the second offset value by determining a difference between an average value of the digital signals stored within the second subset of rows and the average value of the digital signals stored within the third subset of rows; and
a third set of program instructions executable to compensate for offsets in the digital signals stored within the first and second subsets of rows in the memory table by:
applying the same first offset value to each of the digital signals stored within the first subset of rows; and
applying the same second offset value to each of the digital signals stored within the second subset of rows.

7. A method, comprising:
supplying drive signals to a plurality of transmit lines disposed on a touch panel;
receiving sense signals corresponding to sense nodes disposed on the touch panel from a plurality of receive lines disposed on the touch panel;
digitizing the received sense signals; and
adjusting the digital sense signals by:
applying the same first offset value to each digital sense signal corresponding to sense nodes associated with a first subset of the transmit lines, which are coupled to routing traces on only a first side of the touch panel; and
applying the same second offset value to each digital sense signal corresponding to sense nodes associated with a second subset of the transmit lines, which are coupled to routing traces on only a second side of the touch panel, wherein the second offset value is different in value from the first offset value.

8. The method as recited in claim 7, further comprising using the adjusted digital sense signals to detect a location of a touch event on the touch panel.

9. The method as recited in claim 7, further comprising storing the digital sense signals in a memory table having rows and columns, wherein the step of storing the digital sense signals in the memory table comprises:
storing the digital sense signals corresponding to the sense node associated with the first subset of the transmit lines, which are coupled to routing traces on only the first side of the touch panel, within a first subset of rows in the memory table;
storing the digital sense signals corresponding to the sense node associated with the second subset of the transmit lines, which are coupled to routing traces on only the second side of the touch panel, within a second subset of rows in the memory table; and
storing digital sense signals corresponding to sense node associated with a third subset of transmit lines, which are coupled to routing traces on both the first side and the second side of the touch panel, within a third subset of the rows in the memory table.

10. The method as recited in claim 9, wherein the step of adjusting the digital sense signals stored in the memory table further comprises:
determining the first offset value by determining a difference between an average value of the digital sense signals stored within the first subset of rows and an average value of the digital sense signals stored within the third subset of rows;
determining the second offset value by determining a difference between an average value of the digital sense signals stored within the second subset of rows and an average value of the digital sense signals stored within the third subset of rows.

11. An information handling system, comprising:
a touch panel including a plurality of transmit lines and a plurality of receive lines arranged with the plurality of transmit lines in a grid pattern, such that a sense node is disposed on the touch panel at each intersection of the transmit and receive lines, wherein:
a first subset of the transmit lines are coupled to routing traces on only a first side of the touch panel;
a second subset of the transmit lines are coupled to routing traces on only a second side of the touch panel; and
a third subset of the transmit lines are coupled to routing traces on both the first side and the second side of the touch panel; and
a touch controller coupled to the touch panel for supplying drive signals to the plurality of transmit lines, receiving sense signals corresponding to the sense nodes from the plurality of receive lines, digitizing the received sense signals and storing the digital sense signals;
wherein the touch controller is configured to compensate for offsets in the stored digital sense signals by:
determining a first offset value by determining a difference between an average value of the stored digital sense signals corresponding to sense nodes associated with the first subset of transmit lines and an average value of stored digital sense signals corresponding to sense nodes associated with the third subset of transmit lines; and
determining a second offset value by determining a difference between an average value of the stored digital sense signals corresponding to sense nodes associated with the second subset of transmit lines and an average value of the stored digital sense signals corresponding to sense nodes associated with the third subset of transmit lines;
applying the same first offset value to each of the stored digital sense signals corresponding to sense nodes associated with the first subset of the plurality of transmit lines; and
applying the same second offset value to each of the stored digital sense signals corresponding to sense nodes associated with the second subset of the plurality of transmit lines, wherein the second offset value is different in value from the first offset value.

12. The information handling system as recited in claim 11, wherein the touch controller comprises transmit circuitry coupled to supply the drive signals to the plurality of transmit lines via the routing traces on the first side and the second side of the touch panel.

13. The information handling system as recited in claim 11, wherein the touch controller comprises receive circuitry coupled to receive the sense signals and configured to convert the sense signals into the digital sense signals.

14. The information handling system as recited in claim 11, wherein the touch controller comprises a storage medium coupled to store the digital sense signals in a memory table having rows and columns, wherein:
  a first subset of the rows comprises the stored digital sense signals corresponding to the sense node associated with the first subset of transmit lines;
  a second subset of the rows comprises the stored digital sense signals corresponding to the sense node associated with the second subset of transmit lines; and
  a third subset of the rows comprises the stored digital sense signals corresponding to the sense node associated with the third subset of transmit lines.

15. The information handling system as recited in claim 14, wherein the touch controller further comprises a processing device coupled to the storage medium and configured to execute program instructions to compensate for the offsets in the digital sense signals stored within the first and second subsets of the rows in the memory table.

16. An information handling system, comprising:
  a touch panel including a plurality of transmit lines and a plurality of receive lines arranged with the plurality of transmit lines in a grid pattern, such that a sense node is disposed on the touch panel at each intersection of the transmit and receive lines; and
  a touch controller coupled to the touch panel for supplying drive signals to the plurality of transmit lines, receiving sense signals corresponding to the sense nodes from the plurality of receive lines, digitizing the received sense signals and storing the digital sense signals;
  wherein the touch controller is configured to compensate for offsets in the digital sense signals corresponding to sense nodes associated with a first subset of the plurality of transmit lines and the digital sense signals corresponding to sense nodes associated with a second subset of the plurality of transmit lines;
  wherein the first subset of the transmit lines are coupled to routing traces on only a first side of the touch panel, wherein the second subset of the transmit lines are coupled to routing traces on only a second side of the touch panel, and wherein a third subset of the transmit lines disposed between the first and second subsets of transmit lines are coupled to routing traces on both the first side and the second side of the touch panel; and
  wherein the touch controller comprises:
    a storage medium coupled to store the digital sense signals in a memory table having rows and columns, wherein:
      a first subset of the rows comprises digital sense signals corresponding to the first subset of transmit lines,
      a second subset of the rows comprises digital sense signals corresponding to the second subset of transmit lines, and
      a third subset of the rows comprises digital sense signals corresponding to the third subset of transmit lines; and
    a processing device coupled to the storage medium and configured to execute program instructions to compensate for the offsets in the digital sense signals stored within the first and second subsets of the rows in the memory table, and wherein the program instructions comprise:
      a first set of program instructions executable to determine a first offset value by determining a difference between an average value of the digital sense signals stored within the first subset of rows and an average value of the digital sense signals stored within the third subset of rows, and
      a second set of program instructions executable to determine a second offset value by determining a difference between an average value of the digital sense signals stored within the second subset of rows and the average value of the digital sense signals stored within the third subset of rows.

17. The information handling system as recited in claim 16, wherein the program instructions further comprise a third set of program instructions executable to adjust the digital sense signals stored within the first and second subsets of rows in the memory table by:
  applying the same first offset value to each of the digital sense signals stored within the first subset of rows; and
  applying the same second offset value to each of the digital sense signals stored within the second subset of rows.

18. The information handling system as recited in claim 16, wherein the processing device is further configured to execute program instructions to detect a location of a touch event on the touch panel based on the adjusted digital sense signals.

19. A method, comprising:
  supplying drive signals to a plurality of transmit lines disposed on a touch panel;
  receiving sense signals from a plurality of receive lines disposed on the touch panel;
  digitizing the received sense signals and storing the digital sense signals in a memory table having rows and columns; and
  adjusting the digital sense signals stored in the memory table by:
    applying a first offset value to each of the digital signals stored within a first subset of the rows in the memory table; and
    applying a second offset value to each of the digital signals stored within a second subset of the rows in the memory table, wherein the second offset value is different from the first offset value;
  wherein the step of storing the digital sense signals in the memory table comprises:
    storing digital sense signals corresponding to a first subset of the transmit lines, which are coupled to routing traces on only a first side of the touch panel, within the first subset of rows in the memory table,
    storing digital sense signals corresponding to a second subset of the transmit lines, which are coupled to routing traces on only a second side of the touch panel, within the second subset of rows in the memory table, and
    storing digital sense signals corresponding to a third subset of transmit lines, which are coupled to routing traces on both the first side and the second side of the touch panel, within a third subset of the rows in the memory table; and
  wherein the step of adjusting the digital sense signals stored in the memory table further comprises:
    determining the first offset value by determining a difference between an average value of the digital sense signals stored within the first subset of rows and an average value of the digital sense signals stored within the third subset of rows, and
    determining the second offset value by determining a difference between an average value of the digital sense signals stored within the second subset of rows and an average value of the digital sense signals stored within the third subset of rows.

* * * * *